(12) United States Patent
Heimer

(10) Patent No.: US 6,253,006 B1
(45) Date of Patent: Jun. 26, 2001

(54) DIRECTING AND ORGANIZING LENS MEANS FOR A FIBER OPTICS NETWORK

(75) Inventor: Richard J. Heimer, Los Angeles, CA (US)

(73) Assignee: Radiant Optics, Inc., Los Angeles, CA (US)

( * ) Notice: Subject to any disclaimer, the term of this patent is extended or adjusted under 35 U.S.C. 154(b) by 0 days.

(21) Appl. No.: 09/429,157

(22) Filed: Oct. 28, 1999

(51) Int. Cl.[7] .................................................. G02B 6/32
(52) U.S. Cl. ................... 385/33; 385/34; 385/35; 385/36
(58) Field of Search .................... 385/33, 34, 35, 385/36, 37, 38, 39

(56) References Cited

U.S. PATENT DOCUMENTS

| | | | |
|---|---|---|---|
| 4,412,720 | * | 11/1983 | Costa ................................ 385/33 |
| 4,929,070 | * | 5/1990 | Yokota et al. ....................... 385/33 |
| 5,633,967 | * | 5/1997 | Haruta ................................ 385/50 |
| 6,075,912 | * | 6/2000 | Goodman ........................... 385/33 |

* cited by examiner

Primary Examiner—Mohammad Sikder
(74) Attorney, Agent, or Firm—Rockey, Milnamow & Katz, Ltd.

(57) ABSTRACT

A positive-powered lens for directing and organizing the light output from a single light to a plurality of optical fibers has an anterior surface, which is convex, and a posterior surface, upon which are disposed light-converging tessellates, which are arranged in an ordered geometrical (e.g. a square, rectangular, circular, or oval) pattern. The tessellates can have a common surface equation or can have different surface equations but equivalent focal lengths. The tessellates are associated with a plurality of optical fibers, each having a proximal face, which is coplanar with the focal planes of the tessellates.

12 Claims, 6 Drawing Sheets

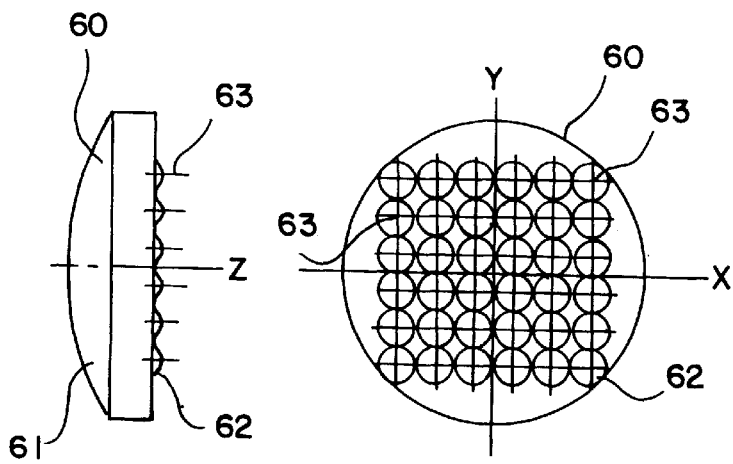
FIG.10a  FIG.10b
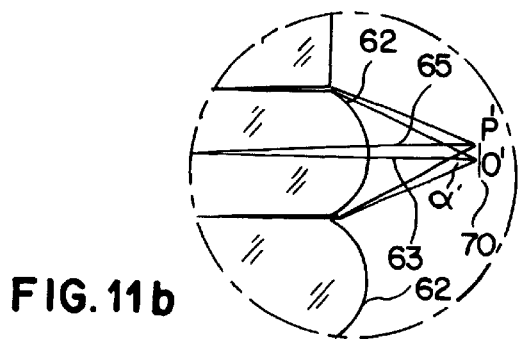
FIG.11b
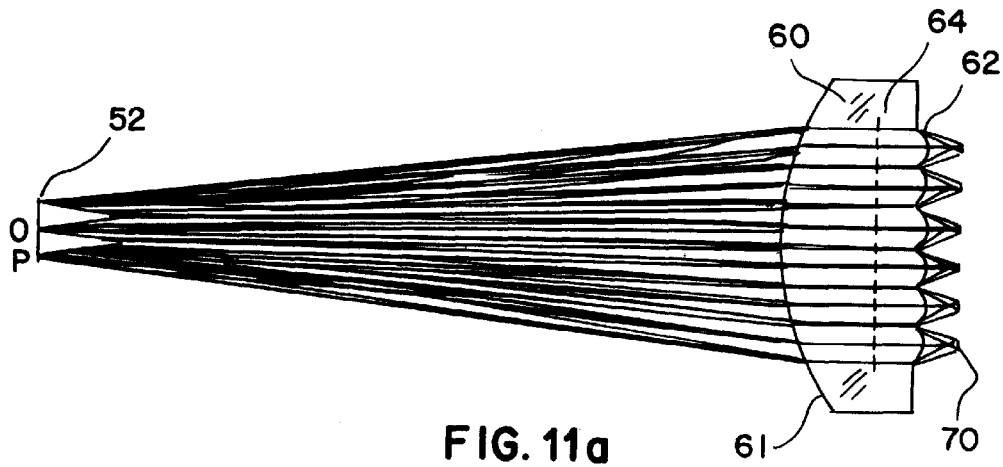
FIG.11a

DIRECTING AND ORGANIZING LENS MEANS FOR A FIBER OPTICS NETWORK

BACKGROUND OF THE INVENTION

A) Field of the Invention

The present invention relates generally to fiber optics lighting systems and, specifically, to a fiber optics illumination device employing a plurality of optical fibers, said fibers arranged in a spaced and ordered geometrical organization, and a single optical element, for example, a lens, for receiving light from a light source, and distributing said light as a secondary source to said plurality of optical fibers in said organization.

B) Description of the Prior Art

It is well known in the field of optics that optical fibers are capable of effectively and efficiently conducting light from a common source along unequal paths to various locations remote from the light source without encountering substantial transmission losses. Because of this characteristic, there is increasing interest in the application of fiber optics to uses where space is limited. One such use is the overall illumination needs of the interior of vehicles where space is scarce or difficult-to-reach due to aerodynamic and styling considerations.

The prior art discloses various concepts that basically employ a plurality of, for example, 36 or more optical fibers formed into a bundle that is typically 5 to 10 millimeters in diameter. The prior art optical system (FIG. 1) consists of a light source 1, a heat rejection filter 3 and a condenser lens 5. The source 1 is imaged on to the entry face 7a of the fiber bundle 7 by condenser lens 6. The fibers of bundle 7 when viewed from its proximal end 7a is seen to be composed of a plurality of fibers (FIG. 1a). The fibers of bundle 7 may be made of glass or polymer fibers. The individual glass fibers consist of a core 11 surrounded by a cladding 12, the clad fibers arranged in a circular cross-section and constrained within sheath 13. Polymer fiber, on the other hand, may or may not have a cladding depending on the specific application and on the diameter of the polymer core. The core of a polymer fiber may be PMMA and, if clad, a fluoropolymer resin, commonly known by the DuPont trademark Teflon, is used as the cladding material. For small diameter fiber, the polymer fiber's exterior is vacuum coated with a thin film of Teflon.

Said fiber bundle 7 subsequent to entry face 7a is splayed into a plurality of individual fibers, forming the main optical harness, wherein their respective distal ends are separated from each other, arranged and spatially ordered into, for example, a square configuration (FIG. 1b). Ferrules 9 are attached to the distal end of each fiber facilitating a means by which individual fibers of at least one additional fiber optics subharness assembly may be attached. The said subharness, in a conjoined relationship with the main harness, comprises a fiber optics harness assembly for conveying light to courtesy lights, indicator status lights and other lit devices within the vehicle.

Referring to FIG. 2, the fiber optics harness assembly 22 may originate at the rear of the vehicle 20 in, for example, its trunk space. Said fiber optics harness 22 is typically split into two branches 23 and 25, each branch transporting light along opposite sides of the vehicle to the various lit devices 27. The method, by which the individual fibers of fiber bundle 7 are separated, arranged and spatially ordered is a technical problem unique to the application.

There is known a distribution device in which the individual fibers of a fiber bundle are mechanically separated, arranged and ordered. The said device, illustrated in FIG. 3, is a fiber optics bundle connector 30 consisting of five major parts, to wit, a cinch ring 35, a hollow cone 37, a spacer 39, a terminal block 31 and a terminal position assurance device (TPA) 33. Cinch ring 35 is used to tightly pack the individual fibers together into a bundle 7 (FIG. 1a). The hollow cone 37 and its spacer 39, inserted therein, are used to compartmentalize and organize the individual optical fibers into an ordered spatial pattern conducive to their eventual routing destinations within the vehicle. The terminal block 31 provides for path-length equalization of the individual fibers throughout the assembly so that all of the fibers may be terminated individually in the same manner. The TPA 33 ensures that the ferrules of the terminated optical fibers are properly located, thus forming the desired fiber spatial organizaton.

Accordingly, the basic purpose of the fiber optics bundle connector 30 is to transform the fiber bundle 7 into an array of spaced and ordered individual fibers forming a two-dimensional pattern 7b to which one or more fiber optics subharnesses may be attached. More importantly, said arrangement positions and orients said individual fibers of the main harness such that the direction of light propagation emerging therefrom are mutually co-parallel and perpendicular to the distal face of the TPA. In said spaced arrangement and orientation, the individual fibers may be conveniently and efficiently culled and coupled to fibers of one or more fiber optics sub-harnesses, extending from the TPA in route to the various lit devices within the interior lighting system.

While this general approach may fulfill overall illumination requirements, there are major shortcomings to this approach. First, there is attendant to this method significant loss in illuminance due to the number of coupling means required. Second, there is accompanying this method a significant variation in both the luminance and luminous intensity incident on the proximal face of the individual fibers of the main optics harness. The prior art method leads to the non-uniform filling of illumination to the proximal faces of the individual fibers of the sub-harness and, hence, at their exit faces which terminate at the various lit devices. Third, the method requires a relatively large number of parts, requiring assembly, as well as the labor necessary to cull individual fibers into various apertures—a procedure which is not considered to be cost effective.

The luminous efficiencies of the prior art approach will now be discussed. Referring to FIG. 1, the factors affecting the level of illumination received at the distal end of an individual fiber are:

1. Total light accepted by the condenser from the lamp.
2. Reflection losses at air-glass surfaces.
3. Losses at the coupling of light source to fiber bundle
4. Internal transmittance of the fiber.
5. Angle ($\alpha'$) of the final Illuminating cone.
6. Losses associated with the in-tandem connection of fibers.

If the light source itself, such as a filament-based lamp, presents an area S, the total light accepted by a condenser of aperture $\alpha$ is given by the formula $$F = \pi B S \sin^2 \alpha$$

The quantity B is a measure of the luminosity of the source, S is the source area and $\alpha$ is the semi-angle of the angular light distribution of the condenser. The source S is imaged by the condenser on the entry face of the fiber bundle, where the aperture angle is α'. The linear magnification between this image and the source is given by $$M = (\sin \alpha)/(\sin \alpha')$$

so that the magnification for areas is $$S'/(S) = M^2 = [(\sin \alpha)/(\sin \alpha')]^2$$

The maximum value of F' exists when the source image just fills the diameter of the entry face of the fiber bundle and sin α' has a maximum value corresponding to the numerical aperture accepted by the individual fibers of the fiber bundle. Provided the image of the light source completely fills the entry face, and the cones of light forming this image have a sin α' equal to the numerical aperture (NA) of the fibers, no increase in the amount of light from the source is possible.

When there is loss due to surface reflections, R, the fraction of light transmitted by a single surface is (1−R), and the transmittance of N surfaces is $$T = (1-R)^N$$

Now, the fraction of light transmitted by the fiber bundle will be considered. A typical arrangement of fibers in a bundle is illustrated in FIG. 1a. Each fiber is composed of a core 11, denoted as the shaded area, surrounded by cladding 12; the interface therebetween providing the necessary total internal reflection action of an optical fiber. The fibers are enclosed within a sheath 13. The ratio of the total area occupied by the fiber cores (shaded areas of FIG. 1a) to the whole area of the bundle defines the core packing fraction (G). The value of this packing fraction is customarily about 0.70, so that only 70 percent of the incident face area of the bundle is active. In addition to this factor in the coupling means, there are reflection losses at the two air-glass surfaces at the ends of the fiber cores. The transmittance of the fiber bundle is seen to be $$T = G(1-R)^2$$

Assuming no losses due to imperfect total internal reflection and absorption of the individual fibers.

Imperfect total internal reflection and absorption are accounted for in the measurement of internal transmittance of a fiber of specified length. If $T_0$ is the internal transmittance of a fiber of length L', the overall transmittance of a fiber of length L is $$T = G(1-R)^2 T_0^{(L/L')}$$

Substituting typical values for the factors affecting the level of illumination, where G=0.70, R=0.06 and $T_0$=0.80 in white light, it is seen that T=0.40.

There are additional losses associated with the in-tandem connection of the individual fibers 7 and 8 between two fiber optics subharnesses (See FIG. 4). An end-fitting adapter means is used to directly couple and secure two fibers at their respective terminal points. The exit face 7b of each individual fiber on the light source side of the harness assembly must be placed in close proximity to the incident face 8a of each individual fiber on the lit device side of said harness assembly, otherwise light will be lost. For large separations, as illustrated in FIG. 4, some light, shown by the shaded regions between rays $L_4$ and $L_3$ and between $L_6$ and $L_7$, is lost even from the light cones emerging from the central portion of the fiber.

Light losses are even more significant for light cones emerging from the peripheral regions of the fiber, wherein more than half the light, as shown as the shaded region between $L_2$ and $L_1$, fall outside the entry face of the receiving fiber. In practice, this source of error will always be present because the end-fitting adapter does not insure intimate contact between abutting ends of two fibers. The light attenuation factor S, due to fiber separation is estimated, for the typical end-fitting means, to be 90 percent (10 percent light loss). Thus, the overall transmission of two in-tandem connected fibers of length L and $L_1$, respectively, is given by the expression $$T_{L+L_1} = GS(1-R)^4 T_0^{(L+L_1)}$$

Again, substituting typical values for the various factors, it is seen that $T^{(L+L_1)}$ is 0.31.

Another source of loss of luminous intensity arising in case of directly coupled fibers is the mismatched radial position between individual fibers. If the exit aperture of each emitting fiber of an in-tandem arrangement is exactly opposite a corresponding receiving fiber, there will be no light lost apart from that hereinbefore described. In practice, some degree of radial mismatch of apertures is unavoidable, thus necessitating the use of the terminal position assurance device 33, shown in FIG. 3.

The non-uniformity of illumination inherent in this approach will now be discussed. It should be noted that, in theory, the luminous flux falling on the entry face of the fiber bundle would be non-uniform. This distribution can be expressed as the quadratic function $$I(r) = -a\, r^2 + b$$

where a and b are constants and r is the radial distance in the entry face of the fiber bundle from its axial center. FIG. 5 is an illustration of the two-dimensional planar light distribution characteristic at the entry face of the fiber bundle. This distribution is not optimal for the following reasons.

The individual fibers receive only the levels of luminosity corresponding to their radial position in the bundle cross-section. The fibers aligned with, and in proximity to the optical axis, receive the maximum flux, whereas the extra-axially positioned fibers progressively receive less light as the bundle-enclosing diameter is approached. The implications are significant. When an individual fiber of the fiber optics bundle is splayed and separated, the irradiance at its distal ends depends on the position (origin) of its proximal end within the bundle and, more specifically, on its proximity to the optical axis, or center, of the fiber bundle. Accordingly, the individual fibers of the main fiber optics harness will emit different levels of luminance. It will, therefore, be seen that the illuminance of the various lit devices within the fiber optics network will vary from one to the other.

The angular light distribution characteristic, in theory, will also be non-uniform. This distribution can also be expressed as a quadratic expression $$I(\sin \alpha') = -a(\sin \alpha')^2 + b$$

where a and b are constants and α' is the semi-angle of the condenser cone of light. FIG. 5a is a two-dimensional representation of the angular light distribution characteristic at the entry face of the fiber bundle. Loss of luminous intensity occurs when α' exceeds the opening aperture of the individual fibers and when the angular light distribution causes the entrance aperture of the fiber bundle to be either under filled or over filled.

FIG. 6a illustrates that light rays originating from the aperture of light source 6b are incident on the proximal face of the fiber bundle 7a at an oblique angle. Individual fibers, particularly those fibers located near the periphery of the bundle may not accept the entire available incident light because the included incident angle exceeds the numerical aperture of these fibers (shaded areas). Consequently, the extra-axial fibers will transmit even less light to their distal end faces than hereinbefore described. The obliquity factor also affects the angular light distribution of the transmitted light at the distal end of an extra-axial fiber. Light incident on the proximal end of an extra-axial fiber 7a will emerge from its distal end 7b as an annular ring, as shown in FIG. 6b. The semiangle of the exiting cone is seen to contain a hollow center cone. The consequence of this hollow cone of light emerging from the distal ends of extra-axial fibers of the main harness is that, when coupled with the corresponding fibers of the sub-harness, the later fibers will transmit less light, further contributing to non-uniform levels of illumination at respective distal end lit devices.

Finally, light sources, such as tungsten halogen lamps, have complex shapes (See FIG. 7) which emit irrational spatial and angular light distribution characteristics. Such a light source, in combinaton with either a dioptric or catoptic condenser, will produce an image laden with artifacts and structure; further exacerbating the non-uniformity in spatial light distribution at the proximal face of the main harness fiber bundle.

Thus, there is a need for a fiber optics illuminating device that will satisfy the overall illumination requirements of vehicle interior lighting systems while avoiding the aforementioned serious shortcomings.

SUMMARY OF THE INVENTION

It is, therefore, the general objective of the present invention to provide a light beam directing and organizing means of connecting a fiber optics network to a light source in a vehicular fiber optics interior lighting system. The operative principle underlying the present invention is to use a single, positive power lens and a plurality of optical fibers arranged into a two-dimensional pattern. Said positive power lens having an anterior surface adapted to receive light from the image of a light source and having a posterior surface that is tessellated, each tessellate adapted to focus light onto the proximal face of each individual fiber of said plurality of optical fibers in said two-dimensional arrangement.

BRIEF DESCRIPTION OF THE DRAWINGS

FIG. 10a is a sectional view of the light beam directing and organizing lens means of the present invention showing its anterior and posterior surfaces;

FIG. 10b is a plan view of the posterior surface of the light beam directing and organizing lens means of the present invention showing posterior surface tessellation;

FIG. 11a is a cross-sectional view of the light beam directing and organizing lens means of the present invention showing the ray paths of the meridional and principal rays, traced from a secondary light source to the proximal faces of several individual fibers;

FIG. 11b is a longitudinal sectional view through a portion of the posterior surface of the light beam directing and organizing lens means illustrating the ray trace geometry for principal and meridional rays in the distal space of the optical system of the present invention.

DETAILED DESCRIPTION OF THE INVENTION

In the following description specific details are set forth, for the purposes of explanation and not limitation, such as particular dimensions, optical surface profiles and optical materials, in order to provide a thorough understanding of the present invention. However, it will be apparent to those skilled in the art that the present invention may be practiced in other embodiments that depart from the specificities given herein.

Figure 1:
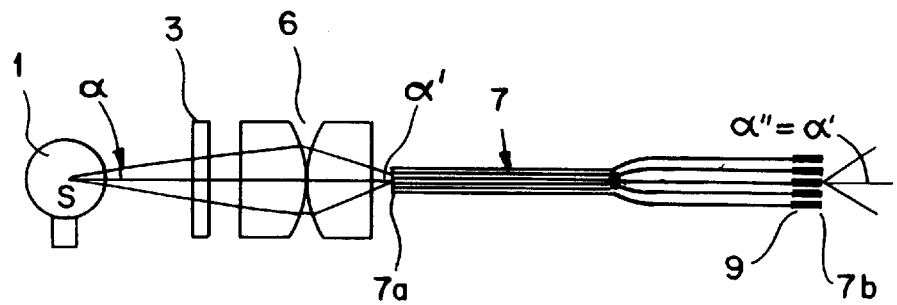
FIG. 1 shows a sectional view illustrating the composition of a fiber optics illuminating system.
Figure 1A:
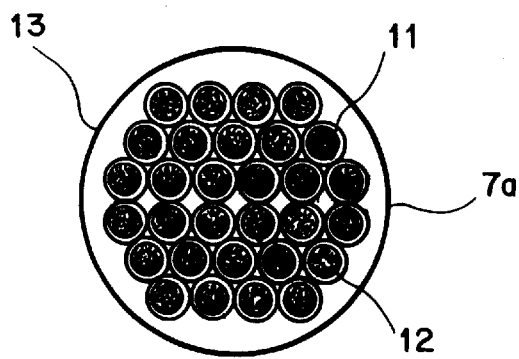
FIG. 1a shows the cross-sectional view of the proximal face of a fiber optics bundle.
Figure 1B:
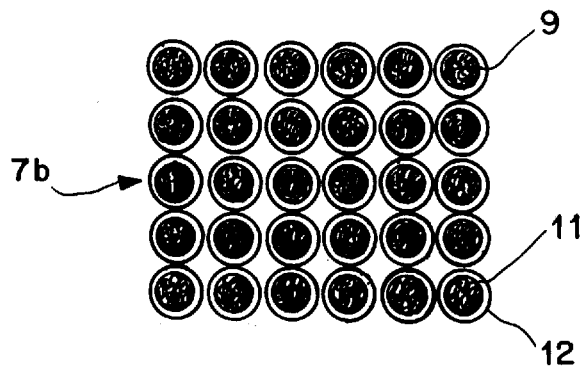
FIG. 1b shows the cross-section view of fibers that have been splayed, separated and ordered into a two-dimensional arrangement.
Figure 2:
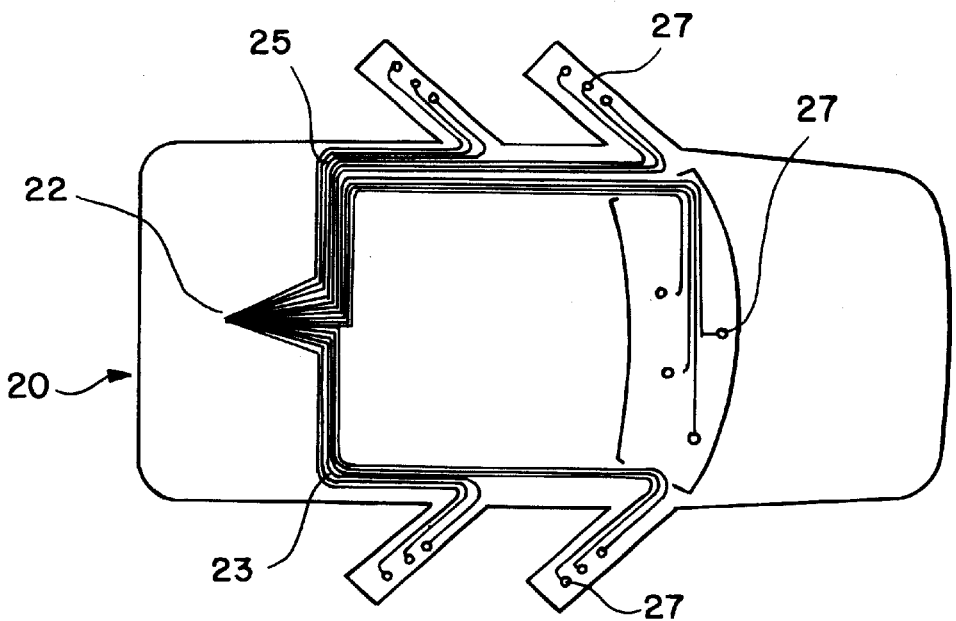
FIG. 2 is an illustration of a typical network of fibers of a vehicular interior lighting system.
Figure 3:
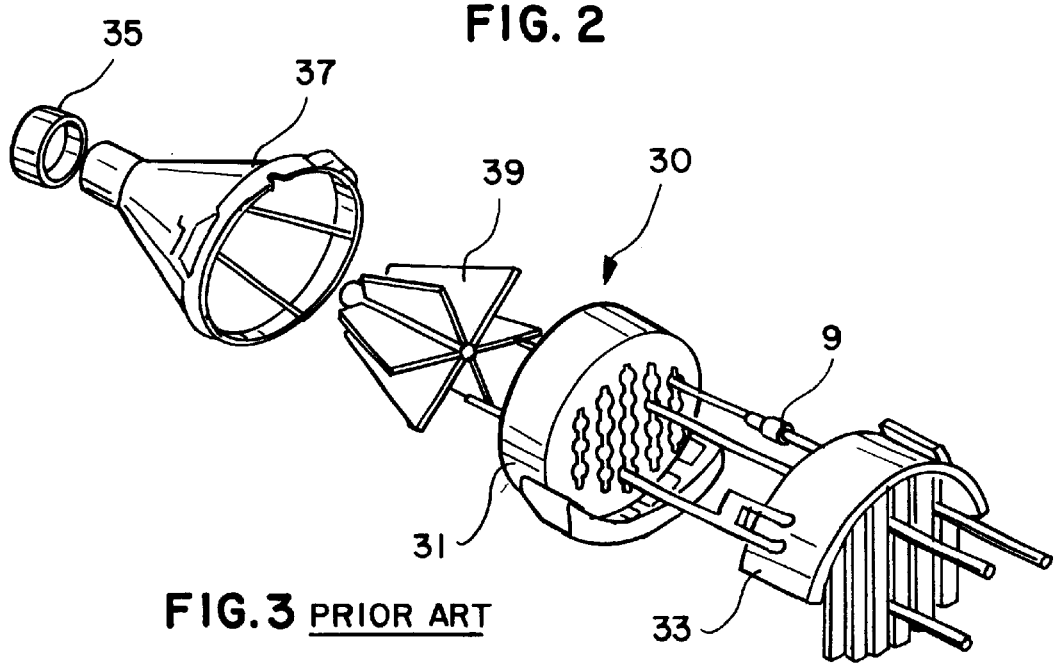
FIG. 3 is a sectional view illustrating the composition of a known fiber optics device for implementing the vehicular interior lighting system network.
Figure 4:
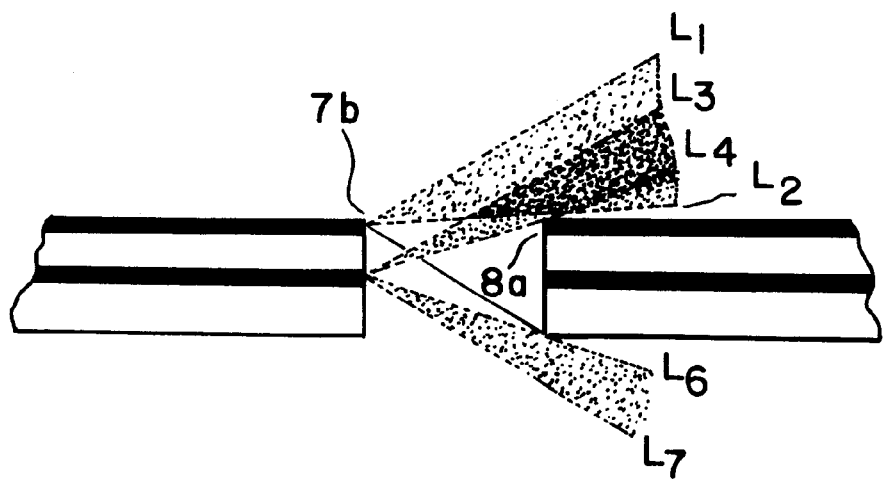
FIG. 4 is a sectional view illustrating the loss in luminance due to the longitudinal separation of the terminal end faces of two directly connected, in-tandem fibers.
Figure 5A:
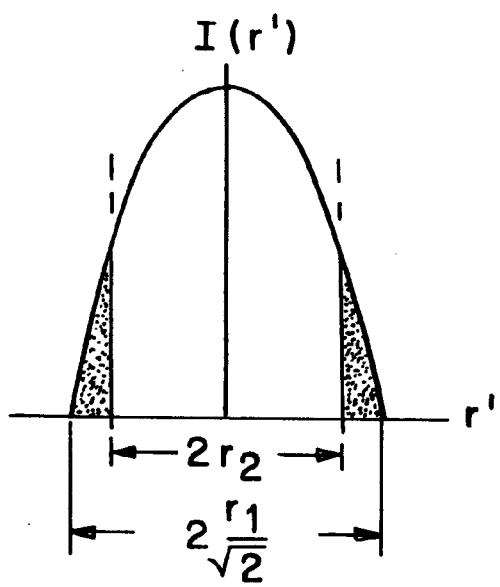
FIG. 5a is a plot of the angular light distribution at the exit pupil of a typical light source, measured in angular units.
Figure 5B:
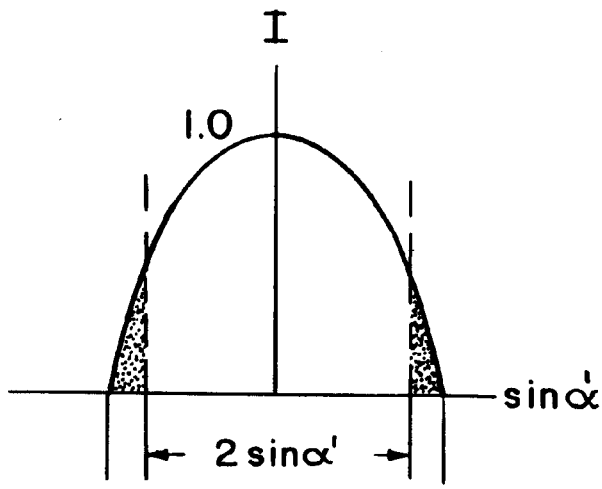
FIG. 5 is a plot of the planar light distribution at the exit pupil of a typical light source, measured in the radial direction.
Figure 6:
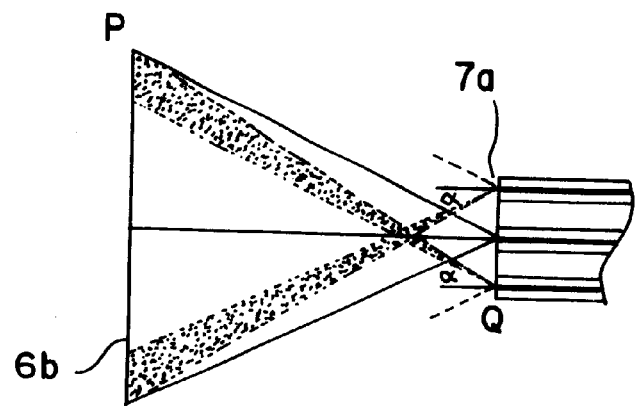
FIG. 6 is a sectional view illustrating the obliquity angle incident on the proximal face of a fiber bundle from a condenser lens.
Figure 7:
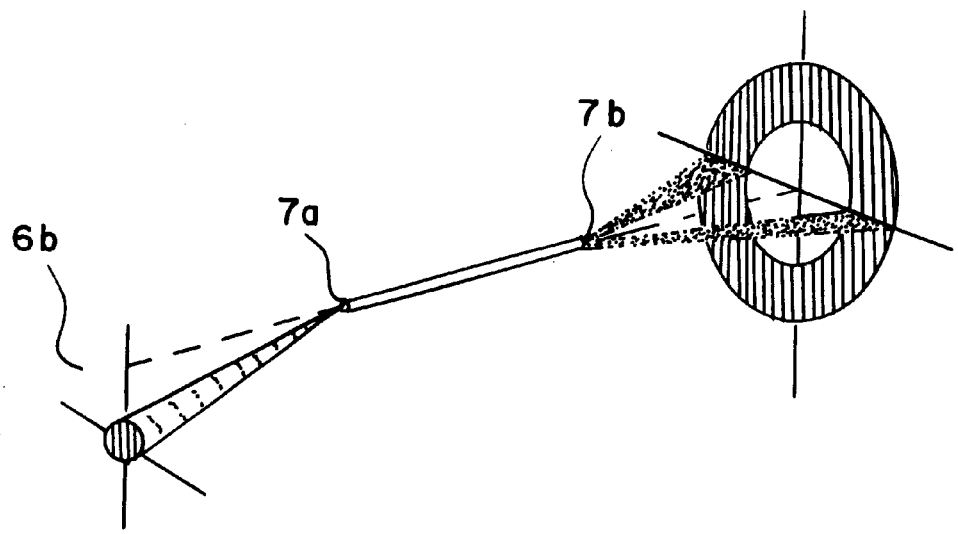
FIG. 7 is a prospective view of the hollow cone effect, at the distal end of a fiber, as produced by an obliquely incident cone of light at its proximal face.
Figure 8:
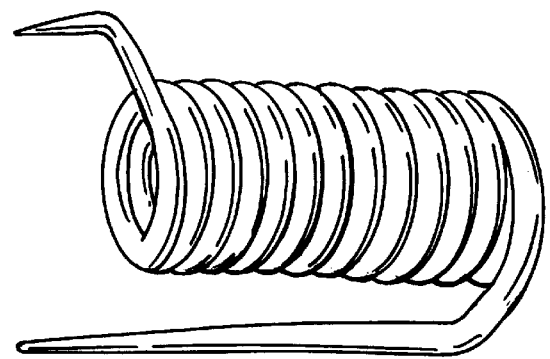
FIG. 8 is a prospective view of the complex structure, shown in grey scale, of the filament of a tungsten halogen lamp.
Figure 9:
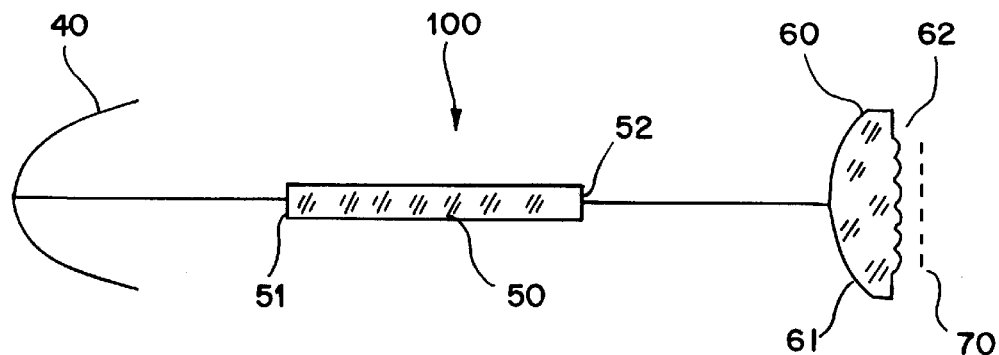
FIG. 9 is a sectional view of a fiber optics lighting system constructed in accordance with the present invention.

A fiber optics lighting system 100 built in accordance with the present invention consists of four components (FIG. 9). It will be understood that these components are optically matched to assure the optimum coupling efficiency in both luminance and luminous intensity from proximal to distal end portions of the lighting system.

Fiber optics lighting system 100 is an on-axis optical arrangement in which the various components lie on and are centered about an optical axis that will hereinafter be described. The optical components of system 100 are longitudinally separated from one another according to an optical system design prescription and the laws of geometrical optics.

Said components of fiber optics lighting system 100 consist of a light source, a lightpipe, or an elongated light transmissive coupling member, a light beam directing and organizing lens means and a fiber optics harness assembly.

A. Light Source

Light source 40 is a low-voltage tungsten-halogen lamp, with an integral ellipsoidal reflector. Specifically, said light source is a member of a family of low-cost, volume-produced incandescent lamps widely known in the lighting industry by the generic designations, MR-11 or MR-16. The designations define the lamp in terms of the diameter of their reflector opening. For example, the MR-11 has an opening diameter of 35 millimeters, while in the case of the MR-16 the reflector diameter is 50 millimeters. These lamps are available in a wide range of voltage and wattage. Further, said lamps are available with different reflector configurations that provide a range of focal distances and source magnification values.

In the preferred embodiment, a 12-volt, 20 watt MR-16 type lamp is utilized having a narrow beam spread, for example, in the range from ±7° to ±12°. In another embodiment, a 5-watt MR-11 type lamp with a similar narrow beam spread may be employed.

B. Lightpipe

Lightpipe 50 is a cylindrical shaped light transmitting member having an elongated central longitudinal axis and is disposed between the focal plane of the light source reflector and the beam directing and organizing optical component. Proximal face 51 is perpendicular to and centered about the optical axis of system 100, said optical axis being defined as the major axis of the prolate ellipsoidal reflector of light source 40. The elongated portion of the lightpipe is parallel to and its centerline coincident with said optical axis. Lightpipe 50 is constructed of a low-index optical material such as fused silica. The cross-section diameter of lightpipe 50, which remains constant over its entire length, corresponds to the light beam diameter at the 1/e level of the intensity profile of the planar light distribution of source 40.

In the preferred embodiment of the present invention lightpipe 50 is a section of a clad cylindrical rod with a core index of refraction of $N_1$ and the clad with index of refraction $N_2$. The acceptance angle, defined as its numerical aperture (NA), of this configuration is given by the expression $$NA=[(N_1)^2-(N_2)^2]^{1/2}$$

where $NA = \sin \alpha$.

If $N_1$ is 1.45 and $N_2$ is 1.3, the lightpipe's NA is 0.64, which corresponds to a critical angle of 40°. Thus, light having an incidence angle $\alpha$ on surface 51 will exit surface 52 of lightpipe 50 with $\alpha'=\alpha$, provided that a does not exceed the critical angle of the lightpipe. The cladding has the additional advantage that the interface surface between core and clad is protected against the accumulation of dirt, fingerprints, etc. which would otherwise frustrate total internal reflection and cause a loss in luminance.

In another embodiment of the present invention, the lightpipe is a section of a cylinder in which there is no cladding. In this embodiment, the incidence angle at surface 51 has a sufficiently small incidence angle, derived from light source 40, such that light may be propagated without significant loss of luminance and that $\alpha'=\alpha$ exists at the distal surface 52 of lightpipe 50.

The planar and angular light distribution characteristic at surface 51 of lightpipe 50, by virtue of the complex physics of the filament source, such as differential filament temperatures, lamp envelope distortion, filament vignetting and convection currents, may be expected to be non-uniform and rotationally asymmetric. Fortunately, it is well known that a cylindrically-shaped lightpipe, having a length to diameter ratio of at least 10:1, tends to produce, through multitudinous, successive total internal reflections, both a planar and an angular light distribution at surface 52 which is rotationally symmetric. The planar and angular light distribution characteristics at surface 52 define a secondary light source for the beam directing and organizing optical element 60 of fiber optics lighting system 100.

B. Light Beam Directing and Organizing Lens Means

The light beam directing and organizing lens means of the present invention consists of a positive power optical element 60 centered on the system optical axis and longitudinally separated from the posterior surface 52 of lightpipe 50. Referring to FIG. 10, optical element 60 is composed of an anterior surface 61 and a posterior surface 62. The material medium of optical element 60 is a borosilicate crown glass having properties suitable for thermo-plastic compression molding, for example, glass type B270, manufactured by Schott Glaswerks, Mainz, Germany.

In the preferred embodiment, anterior surface 61 is a rotationally symmetric aspheric surface described by the polynomial expression $$Z=cy^2\{1+[1-(1+k)c^2y^2]^{1/2}\}^{-1}+dy^4+ey^6+fy^8+gy^{10}$$

where Z is the z-coordinate of the surface, c is curvature (reciprocal of the radius), y is the radial coordinate, k is the conic constant and aspheric deformation coefficients d, e, f, and g. Surface 61 is adapted to correct spherical aberration of the exit pupil (surface 52 of light guide 50).

Posterior surface 62 is the construct of a plurality of sub-aperture refractive elements, or tessellates, embossing said surface in a prescribed two-dimensional geometrical pattern, such as, for example, a square (FIG. 10a). Each tessellate is centered on a local optical axis, said axis being co-parallel to a system, or global, optical axis. Each tessellate has a positive optical power and an accessible boat plane centered on its local optical axis. Said tessellates are arranged in rows and columns wherein the pitch, or separation along both X- and Y-axis, is constant at, for example, 5.08 millimeters, said arrangement forming a system aperture function.

In one embodiment of the present invention, the tessellated surface consist of tessellates that are all optically identical. The optical surface of each sub-aperture tessellate is a rotationally symmetric (about its local optical axis) aspheric defined by the same polynomial expression given hereinbefore.

In another embodiment of the present invention, each tessellate need not be identical to one another, rather each tessellate may be defined by its own unique polynomial expression. Given that the aperture function of centered optical system is bi-symmetrical about its Y-axis, the tessellation process may be simplified in that individual uniquely defined tessellates need only populate one-half of the aperture function. For example, any uniquely defined tessellate centered at an aperture coordinate $(x_1, y_1)$ will have a corresponding, identically defined tessellate centered on the opposite aperture coordinate $(-_1, y_1)$.

D. Fiber Optics Harness Assembly

Fiber optics harness 70 consists of a plurality of fibers arranged in a two-dimensional pattern, such as, for example, a square. The exact number and spatial position of each fiber within the harness assembly 70 corresponding to the number and position of each tessellate 62 on the posterior surface of beam directing and organizing lens means 60. The proximal surface of each individual fiber 71 of fiber optics harness 70 is perpendicular to and co-parallel to the local optical axis 63 of any given tessellate and is longitudinally separated therefrom by a distance equal to the focal length of said tessellate.

Now, the optical attributes of the light beam directing and organizing lens means will be discussed.

This invention is concerned with a light directing and organizing lens means illustrated schematically in FIG. 11a wherein, for purposes of clarity, only six tessellates are shown, all disposed on the Y-axis of said lens means 60. Surfaces 61 and 62 of lens means 60 cooperate to produce an image plane 70 upon which six independent demagnified images of secondary source 52 are formed. Further, a virtual pupil plane 64 is formed longitudinally within the material medium of lens means 60 at a confocal distance between surfaces 61 and 62.

Referring to FIG. 11b, a magnified view of distal space of tessellation 62, the implications of the cooperation of surfaces 61 and 62 are shown in greater detail. Each tessellate has an optical axis 63, which is co-parallel to the optical axis (Z-axis) of lens means 60. Surface 70 is perpendicular to and centered on local optical axis 63. Tessellate 62 forms an image of source 52 at surface 70. That is, point O in surface 52 is imaged at surface 70 as O'. The surface profile of tessellate 62 is adapted to a maximum convergent angle $\alpha'$ at surface 70. Because a virtual pupil 64 exists at the front focal distance of said tessellate, the principal rays 65 emerge from said tessellate parallel to, or telecentric with local axis 63. Thus, point P at source 62 is imaged as point P' in surface 70.

Accordingly, any fiber, the proximal face of which is placed at surface 70, will receive telecentric illumination, i.e., light is launched into the fiber with its direction of propagation along the axis of said fiber. Further, said illumination has an incidence angle $\alpha'$ at the fiber proximal face corresponding to the numerical aperture of said fiber. Under these two conditions, the source illumination and fiber characteristics are optimally matched for maximum illuminance and luminous intensity transfer.

The numerical data for the preferred embodiment of the present invention will now be given. The following nomenclature will be adopted. Radius of curvature of a given surface i will be designated $R_i$, the longitudinal distance between a given pair of adjacent surfaces i and j will be designated as $t_{ij}$, the index of refraction and Abbe number of the material medium between given surfaces i and j will be designated as $N_{ij}$ and $v_{ij}$ respectively. All dimensions are in millimeters. The aspherical surfaces are defined by the expression given hereinbefore wherein $Z_i$ is surface sagitta, $c_i$ is the reciprocal of radius of curvature, $y_i$ is the radial coordinate of the ith surface, $k_i$ is the conic constant and $d_i$, $e_i$, $f_i$, and $g_i$ are aspheric coefficients.

| Preferred Embodiment | | |
|---|---|---|
| $NA_{k+1}$ = 0.50 | | Image Height = 0.50 |
| Object | | |
| | $T_{0.1}$ = 77.4 | AIR |
| R1 = 40.655* | $K_1$ = 0.6344 | |
| | $T_{1.2}$ = 17.05 | $N_{1.2}$ = 1.523 $v_{1.2}$ = 58.6 |
| $R_2$ = -1.902** | $K_2$ = -1.5492 | |
| | $T_{2.3}$ = 3.676 | AIR |
| Image | | |

*Aspheric at Surface 1
$d_1$ = -5.377E-06, $e_1$ = -1.5442E-09, $f_1$ = 1.8084E-12, $g_1$ = -4.2043E-15
**Aspheric at Surface 2
$d_2$ = .01656, $e_2$ = -.004078, $f_2$ = .000567, $g_2$ = -3.175E-05

In summary, it can be seen that the present invention provides a means for organizing and distributing the light output from a single light source to a plurality of optical fibers in a fiber optics harness assembly. In the preferred embodiment, the said means is accomplished by a single positive-power lens element. The salient features of the present invention include:

1. Optimum transfer of illuminance and luminous intensity;
2. Cost effectiveness in manufacture and assembly.

Apart from the luminous losses associated with Fresnel surface reflections and selective absorption of the material media of the present invention, the only appreciable loss in illuminance is that due to the inactive surface area created by the interspaces between tessellates on the posterior surface of the lens means (See FIG. 10b). This loss, however, can also be mitigated by adopting a hexagonal tessellate aperture, instead of a circular one, thus nesting the apertures, as in a honeycomb, to fully cover the posterior surface area.

While the above description contains many specificities, they should not be construed as limitations on the scope of the invention, but rather as exemplification of the preferred embodiments thereof. Many other variations are possible, for example, the geometrical pattern of tessellation, choice of refractive material, type of aspheric surface, etc. Accordingly, the scope of the invention should be determined not by the embodiments illustrated, but by the appended claims, or their equivalents.

What is claimed is:

1. A positive-powered lens for directing and organizing the light output from a single light to a plurality of optical fibers, the lens having an anterior surface, which is convex, the lens having a posterior surface, upon which are disposed a plurality of light-converging tessellates arranged in an ordered geometrical pattern.

2. The positive-powered lens of claim 1 wherein the plurality of light-converging tessellates have a common surface equation.

3. The positive-powered lens of claim 1 wherein the plurality of light-converging tessellates have different surface equations.

4. The positive-powered lens of claim 3 wherein the plurality of light-converging tessellates have equivalent focal lengths.

5. The positive-powered lens of claim 1 wherein a virtual pupil plane is defined between the anterior surface and the plurality of light-converging tessellates.

6. The positive-powered lens of claim 5 wherein the virtual pupil plane is disposed confocally between the anterior surface and the plurality of light-converging tessellates.

7. The positive-powered lens of claim 1 wherein the plurality of light-converging tessellates have respective, telecentric, distal spaces.

8. The positive-powered lens of claim 7 wherein the plurality of light-converging tessellates are associated with a plurality of optical fibers, the number and spatial positioning of which correspond to the number and spatial positioning of the plurality of light-converging tessellates.

9. The positive-powered lens of claim 8 wherein each light-converging tessellate has a local optical axis and wherein each optical fiber has a longitudinal axis, which coincides with the local optical axis of a respective one of the plurality of light-converging tessellates.

10. The positive-powered lens of claim 8 wherein each light-converging tessellate has a focal plane, wherein the focal planes of the plurality of light-converging tessellates are coplanar, and wherein each optical fiber has a proximal face, which is coplanar with the focal planes of the plurality of light-converging tessellates.

11. The positive-powered lens of any one of claims 1 through 10 wherein the ordered geometrical pattern is square, rectangular, circular, or oval.

12. The positive-powered lens of any one of claims 1 through 10 wherein the ordered geometrical pattern is square and wherein each light-converging tessellate has a circular, square, or hexagonal aperture.

* * * * *

UNITED STATES PATENT AND TRADEMARK OFFICE
CERTIFICATE OF CORRECTION

PATENT NO. : 6,253,006 B1  
DATED : June 26, 2001  
INVENTOR(S) : Richard J. Heimer Page 1 of 1

It is certified that error appears in the above-identified patent and that said Letters Patent is hereby corrected as shown below:

<u>Column 7,</u>  
Line 38, "a" should read -- $\alpha$ --.

<u>Column 8,</u>  
Line 25, "boat" should read -- focal --.  
Line 32, "consist" should read -- consists --.  
Line 47, the parenthetical expression should read -- $(x_1, y_1)$ --.

<u>Column 9,</u>  
Line 16, "62" should read -- 52 --.

Signed and Sealed this

Fifth Day of February, 2002

Attest:

JAMES E. ROGAN  
*Attesting Officer*     *Director of the United States Patent and Trademark Office*